(12) United States Patent
Lee et al.

(10) Patent No.: US 7,014,948 B2
(45) Date of Patent: *Mar. 21, 2006

(54) ELECTROCHEMICAL DEVICE USING MULTICOMPONENT COMPOSITE MEMBRANE FILM

(75) Inventors: Seung-Jin Lee, Taejeon (KR); Hyang-Mok Lee, Taejeon (KR); Soon-Ho Ahn, Taejeon (KR); Jin-Yeon Cho, Seoul (KR); Hyun-Hang Yong, Seoul (KR); Hyung-Keun Lee, Taejeon (KR); Sang-Young Lee, Taejeon (KR); Heon-Sik Song, Taejeon (KR); Byeong-In Ahn, Taejeon (KR); Soon-Yong Park, Taejeon (KR); You-Jin Kyung, Seoul (KR)

(73) Assignee: LG Chem, Ltd., Seoul (KR)

( * ) Notice: Subject to any disclaimer, the term of this patent is extended or adjusted under 35 U.S.C. 154(b) by 306 days.

This patent is subject to a terminal disclaimer.

(21) Appl. No.: 10/258,170

(22) PCT Filed: Mar. 5, 2002

(86) PCT No.: PCT/KR02/00377

§ 371 (c)(1),
(2), (4) Date: Oct. 22, 2002

(87) PCT Pub. No.: WO02/071509

PCT Pub. Date: Sep. 12, 2002

(65) Prior Publication Data

US 2003/0104273 A1    Jun. 5, 2003

(30) Foreign Application Priority Data

Mar. 5, 2001   (KR)   .............................. 2001-11192

(51) Int. Cl.
    *H01M 2/16*       (2006.01)
(52) U.S. Cl. ................. 429/144; 429/145; 429/149; 429/152; 429/157; 429/158; 429/160; 429/254
(58) Field of Classification Search ........... 429/144, 429/149, 152, 157, 158, 160, 254, 303, 145
    See application file for complete search history.

(56) References Cited

U.S. PATENT DOCUMENTS

| 5,300,373 | A | 4/1994 | Shackle |
| 5,552,239 | A | 9/1996 | Goldz et al. |
| 5,631,103 | A | 5/1997 | Eschbach et al. |
| 5,639,573 | A | 6/1997 | Oliver et al. |
| 5,837,015 | A | 11/1998 | Venugopal et al. |
| 6,709,785 | B1 * | 3/2004 | Lee et al. .............. 429/144 |
| 6,726,733 | B1 * | 4/2004 | Lee et al. .............. 29/623.3 |
| 2002/0187401 | A1 * | 12/2002 | Lee et al. .............. 429/303 |
| 2003/0013012 | A1 * | 1/2003 | Ahn et al. .............. 429/152 |

FOREIGN PATENT DOCUMENTS

| CN | 1263361 | 8/2000 |
| EP | 0 973 223 A1 | 1/2000 |

* cited by examiner

*Primary Examiner*—Laura Weiner
(74) *Attorney, Agent, or Firm*—Birch, Stewart, Kolasch & Birch, LLP (57) ABSTRACT

The present invention provides a electrochemical element, wherein a multi-component composite film comprising a) polymer support layer film and b) a porous gellable polymer layer which is formed on either or both sides of the support layer film of a), wherein the support layer film of a) and the gellable polymer layer of b) are unified with each other without an interface between them.

12 Claims, 9 Drawing Sheets

ELECTROCHEMICAL DEVICE USING MULTICOMPONENT COMPOSITE MEMBRANE FILM

CROSS REFERENCE TO RELATED APPLICATION

This application is the national phase under 35 U.S.C. § 371 of PCT International Application No. PCT/KR02/00377 which has an International filing date of Mar. 5, 2002, which designated the United States of America.

BACKGROUND OF THE INVENTION (a) Field of the Invention

The present invention relates to an electrochemical element, and particularly, to an electrochemical element with improved energy density comprising multiply-stacked electrochemical cells using multi-component composite films, wherein the multi-component composite films are attached without forming an interface between a support layer film and a porous gellable polymer layer.

(b) Description of the Related Art

There has been growing interest in energy storage technology. The applicable field of the battery has been expanded to cellular phones, camcorders, and notebook computers, and electric vehicles have recently been added to this list. Such expansion has led to increased research and development of batteries with visible outcomes. In this respect, research on electrochemical elements is one of the fields that has been receiving much attention, among which rechargeable batteries are the central field of interest. Recent developments concern designing new batteries and electrodes to improve capacity and specific energy.

Among the secondary batteries being used, lithium ion batteries developed in the early 1990s has become increasingly popular because they have a higher operating voltage and energy density compared to Ni—MH, Ni—Cd, and sulfuric acid-lead batteries that use an aqueous solution electrolyte. These lithium ion batteries, however, have safety problems resulting from the use of organic electrolyte, which causes the batteries to be flammable and explosive. In addition, lithium ion compounds are difficult to manufacture.

Recent lithium ion polymer batteries have overcome such shortcomings of the lithium ion batteries, and are anticipated to become the next-generation batteries. These lithium ion polymer batteries, however, have relatively low capacity compared to lithium ion batteries, and in particular, they have insufficient discharging capacity at low temperatures, and thus they need to be improved.

The capacity of a battery is proportional to the amount of electrode active material used. Thus, it is extremely important to design a cell structure that can be filled with as much electrode material as possible within the limited space of the battery package. The most widely known and used type of cell structure is a jellyroll-shaped structure used in a cylindrical or a prismatic battery. Such a structure is prepared by a process of coating and pressing active electrode material onto a metal foil which is used as a current collector, followed by cutting it into a shape of a strip having a predetermined width and length, separating the negative electrodenegative electrode and positive electrode using the separator film, and then rolling it into a spiral form. Such a jellyroll structure is widely used for manufacturing cylindrical batteries. This structure, however, has a small radius of curvature at the center portion of the spiral, which often results in extreme stresses at the bending surface of the electrode, often causing exfoliation of the electrode. This facilitates the deposition of lithium metal at the center portion of the electrode during the repeated charge and discharge of the battery, which may shorten the lifespan of the battery while degrading its safety.

Generally, the widely known and used method of manufacturing a thin prismatic-shaped battery comprises the aforesaid process of rolling the spiral shaped jellyroll into an oval shape and then compressing it, followed by inserting it into a rectangular container. This method is not free from the aforesaid problems of reduced lifespan and safety, but rather it has increased the problems caused by the decrease in the radius of curvature due to the oval shape. Also, the problem of reduced performance is greater because manufacturing a tight spiral structure is inherently impossible. Furthermore, a discrepancy between the oval shape of the jellyroll and the rectangular shape of the container reduces the rate of utilized volume. This is known to reduce approximately 20% of the weight energy density and 25% of the volume energy density when the container is taken into account. In reality, a prismatic lithium ion battery is reported to have a lower capacity density and specific energy compared to a cylindrical one.

Recently, various patents and technologies proposing to solve the problems of the spiral jellyroll structure and providing cell structures suitable for a prismatic container have been published. These proposals, however, only provide partial solutions to the problems or they cause other problems that are more difficult to solve, so they have not become practical. For example, U.S. Pat. No. 5,552,239 describes a process of first placing and laminating a separator layer or a polymer electrolyte film between the positive electrode and negative electrodenegative electrode, then cutting it into a strip form with a predetermined length and width, followed by gradually folding a cell having an negative electrode/separator layer/positive electrode layered structure into a square form. The inventors of the present invention have tried to replicate this process but they found that it was difficult to manufacture the cells in such a way. The laminated cells were so stiff that they were difficult to fold, and when they were folded by exerting force, a problem arose in the folded area because it was fractured in a manner similar to that of the jellyroll cells.

In a fan-folding method described in U.S. Pat. No. 5,300,373, the pressure and stresses at the inner layer of the abruptly bending portion are transferred to the outer layer and are diverged so that twisting and stretching occur, finally resulting in a "dog bone" shaped cell. Thus, the problems of exfoliation, cracks, and crumbling, encountered in jellyroll structures, also occur frequently. Also, the cells with this structure are inherently prone to snapping, and therefore the possibility of making a practically applicable battery is very low.

Meanwhile, U.S. Pat. No. 5,498,489 attempted to solve and improve such problems in the bending portions. It provides a fundamental way of avoiding exfoliation of the electrodes by leaving out the electrodes at the folding portions and providing connections only through the use of current collectors and separator layers or polymer electrolyte portions, but it is difficult to compose such a cell. Furthermore, too high a volume of the current collectors is used so electrolyte volume is reduced. Thus, the structure is not very practical because it has many inefficient factors.

Electrolytes are classified as liquid electrolyte and solid electrolyte. Liquid electrolyte comprises a salt dissolved and dissociated in an organic solvent, and it has high ionic conductivity. Liquid electrolyte is generally used together with a polymer separator, e.g. a polymer film such as a polyolefin with pores that has ionic conductivity because of liquid electrolyte in the pores. The ionic conductivity varies depending on the porosity of the polymer separator, and the polyolefin separator generally has an ionic conductivity of about 1 mS/cm.

But the liquid electrolyte may leak out of the polymer separator due to its high fluidity. In addition, the liquid electrolyte cannot provide adhesion between an electrode and a separator, and thereby the battery is structured with an interface between them. In spite of these disadvantages, it has an advantage of high mechanical strength due to its high crystallinity, thus it neither over-swells nor decomposes.

On the other hand, the solid electrolyte has an ionic conductivity that is insufficient to be used in a battery at room temperature. In order to improve the ionic conductivity of the solid electrolyte, a gellable polymer electrolyte has been suggested, in which liquid electrolyte comprising a salt dissolved in an organic solvent is impregnated in a solid polymer electrolyte, e.g. a hybrid-type electrolyte as disclosed in U.S. Pat. No. 5,418,091, available from Bellcore Co. However, when the gellable polymer electrolyte is used for an electrolyte of a battery, there are problems in battery assembly due to its low mechanical strength, and the polymer electrolyte may be over-swelled, its thickness may increase, and energy density may decrease due to a decrease in the density of the polymer electrolyte, even though the polymer electrolyte has a thickness of greater than 50 μm in order to insulate between electrodes and to obtain sufficient mechanical strength in a battery. Furthermore, since a plasticizer having a low molecular weight that is harmful to the environment is used, and an extraction process thereof is further required, it is problematic to mass-produce a battery with the solid electrolyte.

The polymer electrolyte requires electrochemical stability in working voltage, and thermal and chemical stability. Preferably, it has an ionic conductivity of more than 1 mS/cm at room temperature, a wet-out rate that is superior to that of non-aqueous electrolyte, and high chemical-resistance. In addition, it is preferable that the polymer electrolyte adhesion is sufficient to decrease the interfacial resistance between the electrolyte and electrodes during battery assembly, and that it has enough mechanical strength during battery assembly. However, it is known that when the ionic conductivity increases, the mechanical strength deteriorates, and vice versa.

To increase both the ionic conductivity and the mechanical strength, it is disclosed that a porous polymer layer and a gellable multi-layer film are used for a separator in U.S. Pat. Nos. 5,639,573, 5,716,421, 5,631,103, and 5,849,443, and in European Patent Application No. 0 933 824 A2. The porous polymer layer comprises a material that is resistant to swelling due to restrictive absorption of liquid electrolyte, and the exemplary materials include polyethylene, polypropylene, polytetrafluoroethylene, polyethylene terephthalate, polybutyleneterephthalate, and polyethylenenaphthalate, and a multi-layer film or film blended thereof. The gellable polymer comprises a self-gellable and self-swellable material when it is contacted with liquid electrolyte, and the exemplary materials includes polyvinylidenefluoride, polyurethane, polyethyleneoxide, polyacrylonitrile, polymethylmethacrylate, polyacrylamide, polyvinylacetate, polyvinylpyrrolidinone, and polytetraethylene glycol diacrylate, and a copolymer thereof.

When the aforementioned separator is used, the mechanical properties can be improved, but the polymer electrolyte has ionic conductivity that is lower than those of the porous polymer and the liquid electrolyte dissolved therein, resulting from the ionic conductivity-resistance of the gellable polymer. U.S. Pat. Nos. 5,631,103 and 5,849,433 disclose that a plasticizer having a low molecular weight, such as dibutyl phthalate, is used in order to enhance the ionic conductivity of the separator. However, the plasticizer is harmful to the environment, and it makes mass production of a battery difficult.

In addition, a multi-layer film prepared by the aforementioned method has a dense gellable polymer layer having no pores, its ionic conductivity-resistance increases undesirably, and an interfacial adhesion strength between the porous polymer layer and the gellable polymer layer weakens.

Further, although various separator layers or separator films are used in a battery made with many stacked cells, it is still required to provide a separator film or separator layer having a high ion conductivity, good interface contact characteristics between electrode and electrolyte, and high mechanical strength.

SUMMARY OF THE INVENTION

It is an object of the present invention to provide an electrochemical element comprising electrochemical cells which are multiply-stacked, wherein a separator film or a separator layer is made from a novel multi-component composite film consisting of a porous gellable polymer layer and a support layer film, so that the battery is easy to manufacture and has a structure making efficient use of the space available while considering the prior art, and wherein the film has good adhesion between an electrode and a polymer electrolyte, and good ionic conductivity and mechanical properties.

In order to accomplish the objects of the present invention, the present invention provides an electrochemical element comprising electrochemical cells that are multiply-stacked with separators interposed between each stacked cell, wherein the separator film comprises:

a) a polymer support layer film; and b) a porous gellable polymer layer which is formed on one side or both sides of the support layer film, wherein the support layer film of a) and the porous gellable polymer layer of b) are united with each other without an interface between them.

It also provides an electrochemical element comprising electrochemical cells which are multiply-stacked, wherein a) said electrochemical cells are formed by stacking:

i) fuel cells having a positive electrode, a separator layer, and an negative electrode sequentially as a basic unit; or ii) ① bicells having a positive electrode, a separator layer, an negative electrode, another separator layer, and another positive electrode sequentially as a basic unit or ② bicells having an negative electrode, a separator layer, a positive electrode, another separator layer, and another negative electrode sequentially as a basic unit; and iii) a separator film interposed between each stacked cell;

b) each of said separator film, said separator layer or both comprises:

i) a polymer support layer film and ii) a porous gellable polymer layer which is formed on one side or both sides of the support layer film, wherein said support layer film of i) and the porous gellable polymer layer of ii) are united with each other without an interface between them.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The subject of the present invention is an electrochemical element comprising electrochemical cells that are multiply-stacked with a separator film interposed between each stacked cell. The stacked electrochemical element according to the present invention preferably comprises electrochemical cells that are multiply-stacked with a bicell or a fuel cell as a basic unit, with a separator film interposed between each stacked cell.

The separator film is a film to separate each fuel cell or each bicell a basic unit and to interpose between them so that the cells are stacked. The electrochemical element of stacked cells is more convenient to manufacture and uses space more efficiently. Particularly, it solves the problems relating to the conventional stacked cell structure and provides a unique but simple cell structure capable of maximizing the content of electrode active material. The present invention does not make avail of longitudinally cut electrodes used for spiral winding or folding, but rather it uses a method of stacking electrodes cut in a predetermined form.

Further, the electrochemical element of the present invention comprises a separator layer which is included in the fuel cell or the bicell, and a separator film interposed between each stacked cell, wherein the separator layer and the separator film are in the form of a multi-component film comprising a polymer support layer film and a gellable polymer which are united with each other without an interface between them, so that the stability relating to liquid electrolyte and cycle characteristics are improved.

Hereinafter, a structure of the electrochemical element according to the present invention will be discussed in detail with reference to the figures.

Figure 1A:
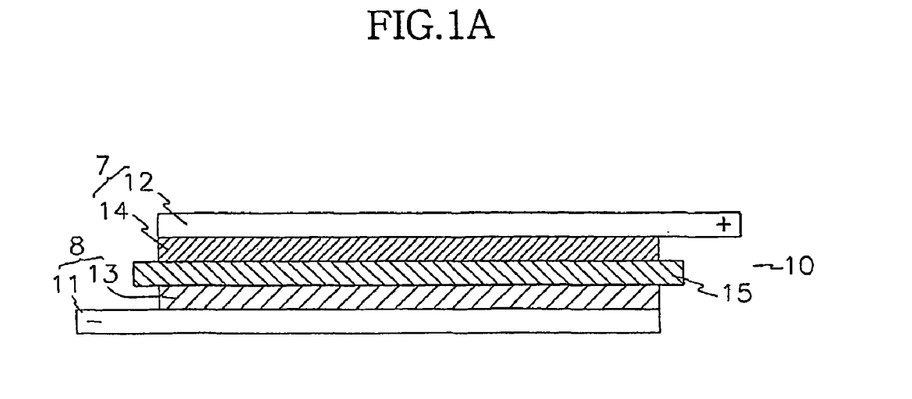
FIG. 1a shows a layered structure of a fuel cell comprising a single-side coated positive electrode, a single-side coated negative electrode, and a separator layer.

The most typical cell structure is illustrated in FIG. 1a, wherein a layered structure of a positive electrode, a negative electrode, and a separator layer is cut into a regular shape and size, and then stacked to form a full cell 10. In the present invention, the fuel cell 10 of such a structure is treated as a unit cell which constitutes a battery. Exemplarily, in a lithium rechargeable cell, the positive active material 14 mainly comprises lithium intercalation materials such as lithium manganese oxide, lithium cobalt oxide, lithium nickel oxide, or a complex oxide formed from a combination of the aforesaid oxides, said positive active material being bonded to the positive current collector 12, that is, a foil prepared from aluminum, nickel, or a combination thereof, to form a positive electrode 7. Also the negative active material 13 mainly comprises lithium metal or lithium alloy, and lithium intercalation materials such as carbon, petroleum coke, activated carbon, graphite, or other carbons, said negative electrode material 13 being bonded to a negative current collector 11, that is, a foil prepared from copper, gold, nickel, copper alloy, or a combination thereof, to form a negative electrode 8.

The separator layer 15 is a multi-component film comprising a polymer support layer film and a gellable polymer which are united with each other without an interface between them, as described above.

The unit structure of the fuel cell 10 shown in FIG. 1a is composed of a positive electrode 7, a separator layer 15, and a negative electrode 8, sequentially. The separator layer 15 is located at the center of the cell. A plurality of these unit cells can be stacked as shown in FIG. 1b to prepare a battery with practical capacity.

Figure 1B:
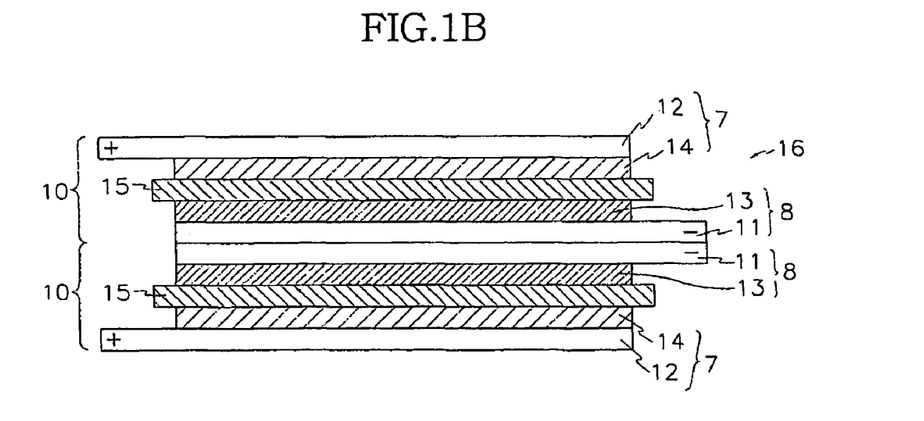
FIG. 1b shows a layered structure of a cell where two fuel cells of FIG. 1a are stacked.

The stacked cell 16 shown in FIG. 1b has only two unit cells stacked as (10)/(10), but as many cells as desired can be stacked. The number of unit cells to be stacked is designed and determined according to the desired capacity of the battery. In a stacked cell 16 structure, the electrodes overlap between the unit cells. If many units of cells are stacked, the number of overlapping electrodes will also increase. As a result, space utilization will decrease. Coating and using only a single side of the current collector during the preparation of the electrodes causes such a problem.

Figure 2A:
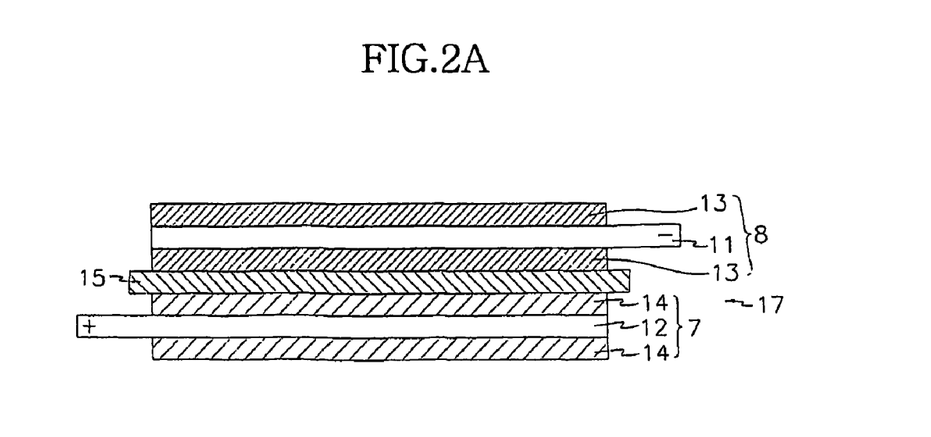
FIG. 2a shows a layered structure of a fuel cell comprising a both-side coated positive electrode, a both-side coated negative electrode, and a separator layer.

The present invention provides a way to make more efficient use of the space when multiple unit cells are overlapped, that is, it seeks to avoid overlapping current collector plates by using a structure with identical active material coated on both sides of the current collectors. If a fuel cell is prepared using electrodes coated with electrode materials on both sides, a new unit cell having such a structure as the fuel cell 17 of FIG. 2*a* comes into existence.

Figure 2B:
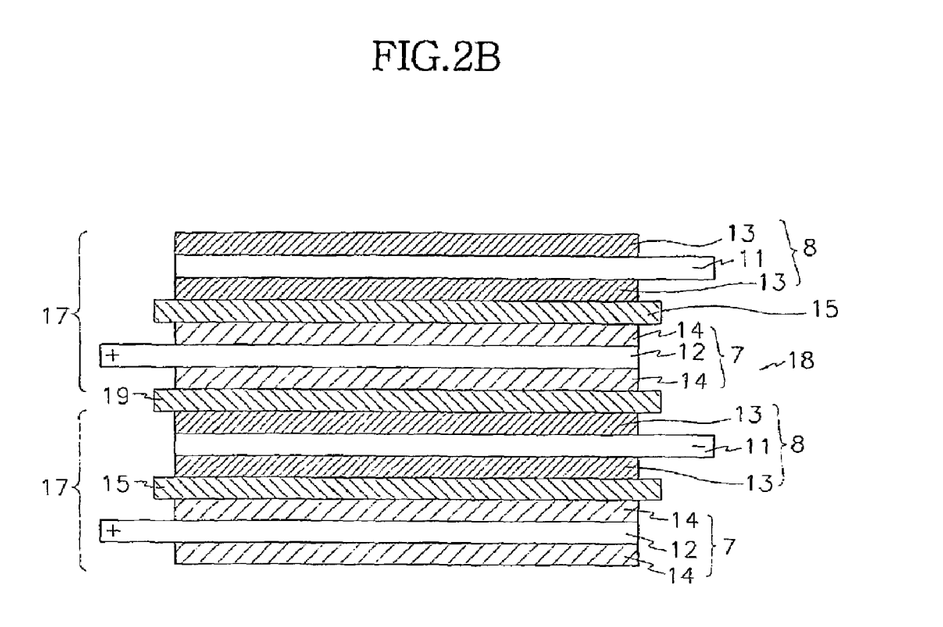
FIG. 2b shows a layered structure of a cell where two fuel cells of FIG. 2a are stacked.

A stacked cell 18 as in FIG. 2*b* is prepared by stacking two fuel cells 17 as a unit cell and inserting a polymer separator layer such as the aforesaid separator layer 15 or the separator film 19 therebetween. Such a structure becomes very efficient because the outer active coating material not used within a unit cell is shared with the opposite electrode active coating material of an adjacent unit cell, forming a new fuel cell. This structure becomes more effective as more unit cells are stacked. The electrode materials of the outermost negative active material 13 and positive active material 14 of the stacked cell 18, however, are not shared or used because the current collectors are used as foils. The proportion taken up by the unused material decreases as the stacks increase in unit cells. Because the number of unit cells is large is considering the thickness of the unit cell and the thickness of the battery that is practically used, such a cell structure is sufficiently effective.

Figure 3:
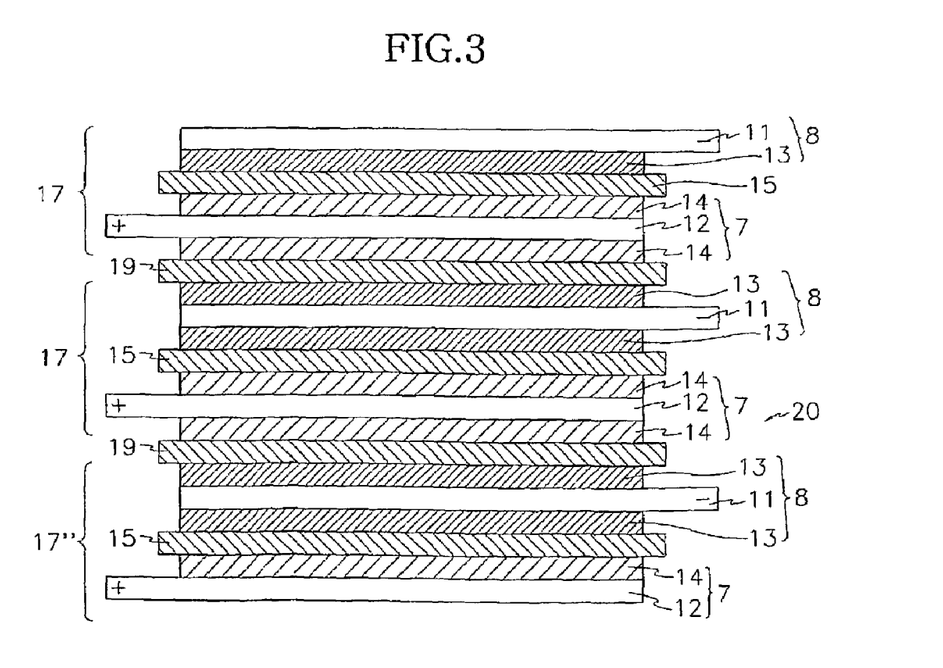
FIG. 3 shows a layered structure of a stacked cell where a fuel cell is a unit cell.

As shown in FIG. 3, three cells are stacked, which is considered as the most effective structure upon considering all the above factors. It has the minimum number of stacked unit cells. By stacking fuel cell structures 17' and 17" each having one electrode coated on both sides and the other electrode coated on a single side on either side of the fuel cell 17, a new stacked cell 20 is produced with a structure of 17'/17/17".

Thus, the unused portion of the outer active electrode material appearing in the stacked cell 18 of FIG. 2*b* is eliminated. To achieve capacity for a practical use, a plurality of layers is stacked such as (17')/(17)/(17) . . . (17)/(17"). Thus, the more cell is stacked, the less different in terms of space utilization efficiency of the stacked cell 20 from that of the stacked cell 18 which has a structure of (17)/(17)/(17) . . . (17)/(17). The stacked cell 20 structure, however, may be very effective for a thin layer card-type battery.

Figure 4A:
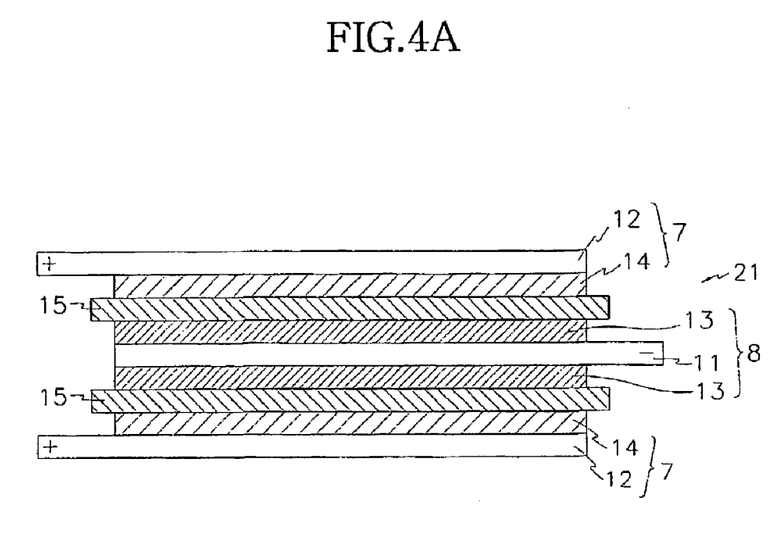
FIG. 4a shows a layered structure of a bicell comprising two single-side coated positive electrodes, a both-side coated negative electrode, and a separator layer.

The overlapping middle electrode plate of the stacked cell 16 structure as shown in FIG. 1*b* degrades the efficiency of the cell as discussed above. Therefore, an efficient structure unifying the overlapping electrodes between the cells themselves can be treated as a new unit cell. The cell 21 shown in FIG. 4*a* is such a new unit cell, being a bicell structure having a polarity at the middle and an opposite polarity at both sides.

Figure 4B:
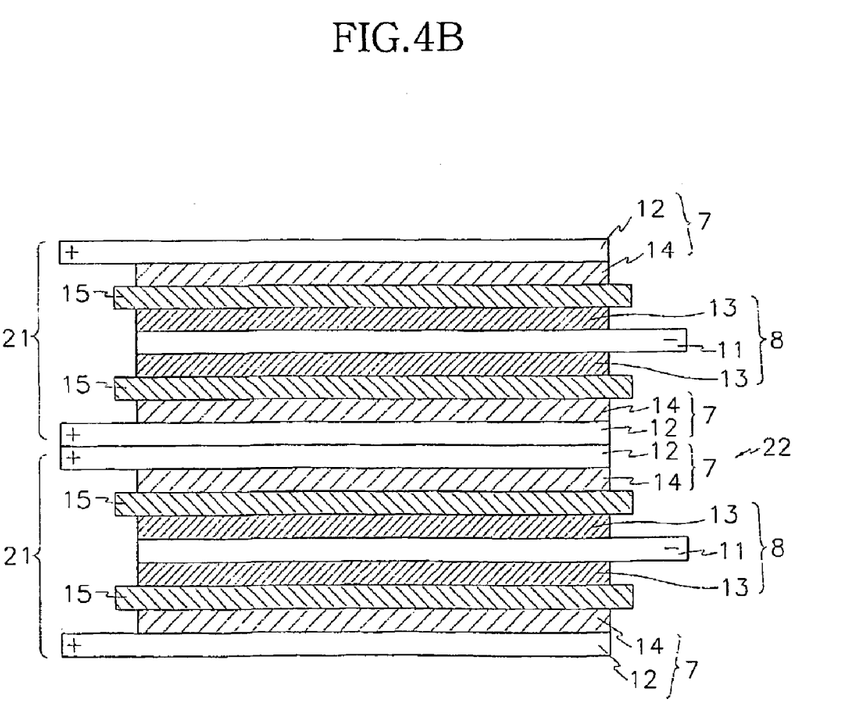
FIG. 4b shows a layered structure of a cell where two bicells of FIG. 4a are stacked.

A cell having high space utilization can be made by stacking such bicell units as the (21)/(21) structure shown in the stacked bicell 22 of FIG. 4*b*. Alternatively, more layers of such units can be stacked to form a battery. In this embodiment, however, overlapping electrodes between the bicells also appear as in the case of the stacking cell 16 of FIG. 1*b* where fuel cells 10 of FIG. 1*a* are stacked. The details are the same as those of the stacking cell 16 structure, and the space utilization problem also exists, because the negative current collector is coated on both sides but the positive current collector is coated on a single side as can be seen in the bicell 21 of FIG. 4*a*. Although the overlapping of the stacked cell 22 of FIG. 4*b* is less frequent compared to the stacked cell 16 of FIG. 1*b*, the space utilization is nevertheless reduced.

Figure 5A:
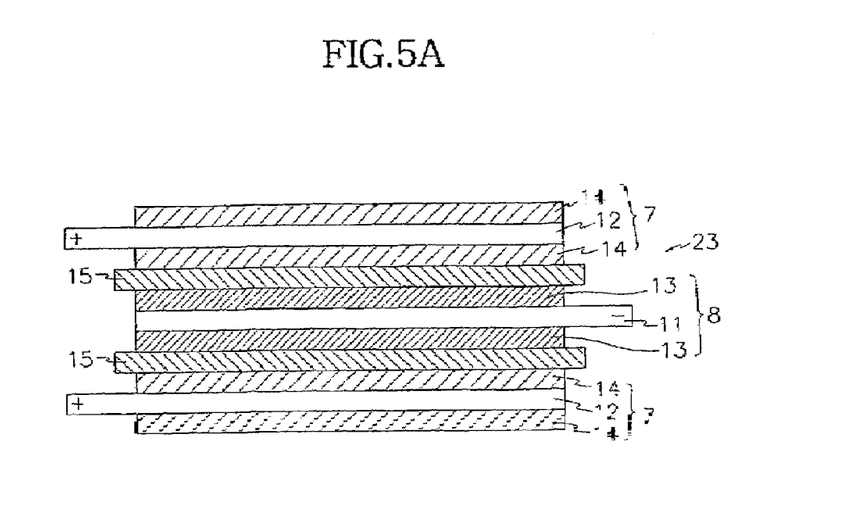
FIG. 5a shows a layered structure of a bicell where an negative electrode is a middle layer and both outer portions are positive electrodes.
Figure 5B:
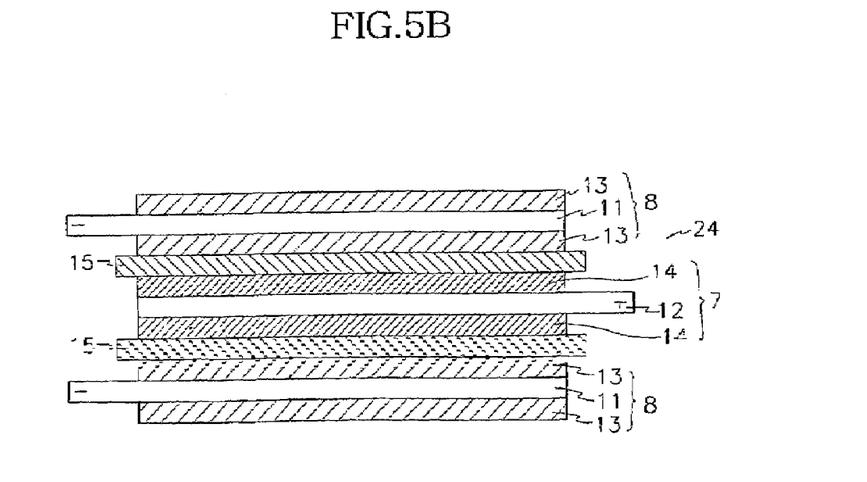
FIG. 5b shows a layered structure of a bicell where a positive electrode is a middle layer and both outer portions are negative electrodes.

The present invention provides a way to use the cell structure in a more space-efficient manner compared to the case where a bicell is used as a unit cell to be multiply stacked. That is, the present invention provides a method of avoiding the overlapping of the current collectors by using current collectors coated with identical active material on each side. To such end, two types of bicells 23 and 24 are defined, which use electrodes with both sides coated as shown in FIG. 5*a* and 5*b*. The bicell 23 in FIG. 5*a* places the negative electrode at the center and the positive electrodes at the outer sides, whereas the bicell 24 of FIG. 5*b* places the positive electrode at the center and the negative electrodes at the outer sides.

Figure 6:
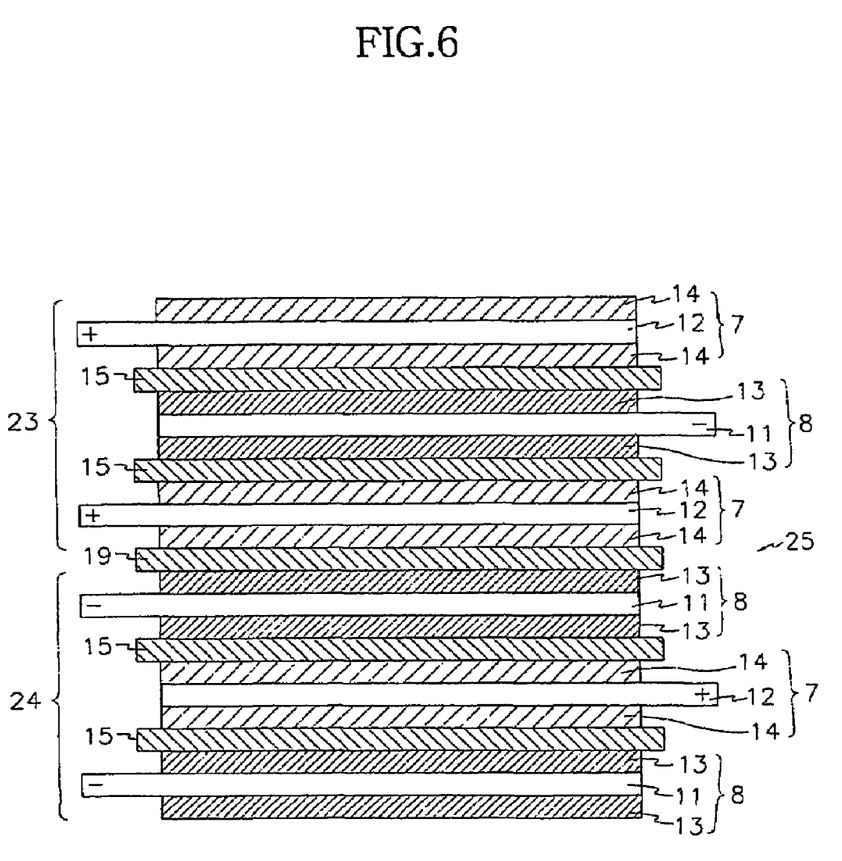
FIG. 6 shows a layered structure of a stacked cell where two types of bicells are unit cells of FIGS. 5a and 5b.

When the bicells are stacked in a (23)/(24) structure as in stacked cell 25 of FIG. 6 and the aforementioned polymer separator layer such as the separator layer 15 or separator film 19 are inserted between the bicells, the outer active coating material not used within a bicell is shared with an opposite electrode active coating material of an adjacent bicell, forming a new fuel cell, which is a very efficient structure. Such a cell can also be stacked into multiple layers. In this case, if the separator films 19 are interposed between the cells, and the bicells are alternately stacked as in (23)/(24)/(23)/(24)/ . . . (23)/(24)/(23), the polarity of the battery is naturally formed without discrepancy. The outermost-stacked bicell of the battery can be either bicell 23 or bicell 24, the only difference being whether the unused electrode material is an negative electrode or a positive electrode. The proportion of such unused electrodes decreases as the number of cells increases and it has little influence on a battery with a practical thickness.

Figure 7:
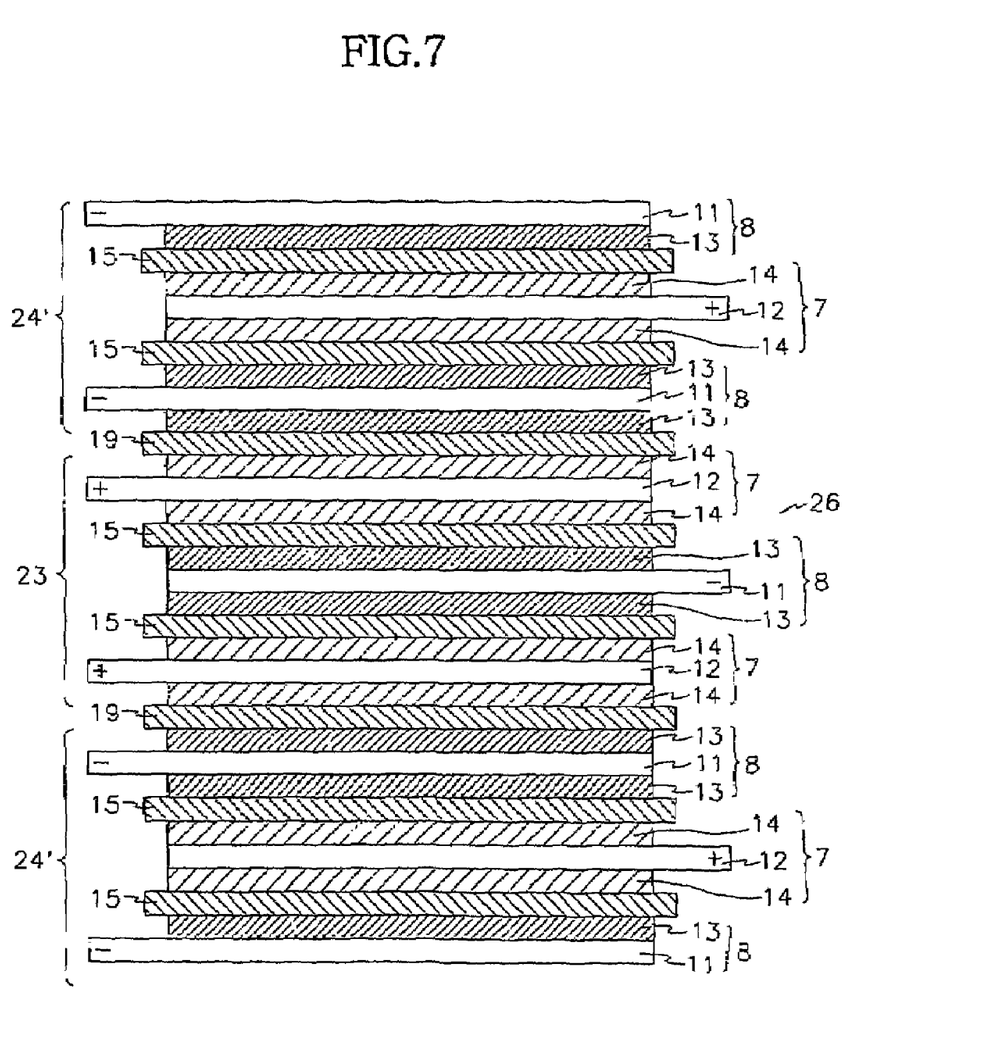
FIG. 7 shows a layered structure of a cell composed of two types of alternately stacking bicells comprising single-side coated electrodes, both-side coated electrodes, and separator layers.

FIG. 7 shows a stacked cell 26 where the bicell is a basic unit and all the above factors are considered to make an efficient structure. In this drawing, only three bicells are stacked. When the primes (') denote structures where only one out of two outer electrodes of the bicell is left as the foil, there is no portion of active electrode material that is not used when the bicells are stacked to a form of (24')/(23)/(24') as shown in stacked cell 26 of FIG. 7. Variations in structure such as (23')/(24)/(23'), along with other combinations are also possible. As explained above, when the bicells are stacked in multiple layers as (24')/(23)/(24)/(23) . . . /(24)/(23)/(24'), there will be less difference in space utilization efficiency compared to (24)/(23)/(24)/(23) . . . /(24)/(23)/(24) shown in the stacked cell 25 of FIG. 6 as layers increase. In a thin layer card-type battery, however, the structure of stacked cell 26 of FIG. 7 is effective.

According to the present invention, the electrochemical element comprises a fuel cells or bicells as basic units which are multiply-stacked, and a separator layer or a separator film of a polymer electrolyte interposed between the stacked cells, wherein the separator is a multi-component composite film comprising a polymer support layer film and a gellable polymer that are united with each other without an interface between them. The conventional multi-component composite film, which is used as a polymer electrolyte, is prepared by coating a polymer film having pores of regular size with the gellable polymer layer. In contrast, a multi-component composite film of the present invention is prepared by coating a common polymer film with a gellable polymer material, forming gellable polymer layers on a common polymer film having no pores, and stretching and thermal setting, and the resultant film is used for a polymer electrolyte. The polymer electrolyte system for electrochemical elements using the multi-component is prepared by impregnating the composite film with an aqueous electrolyte. In addition, in order to improve ion conductivity, the polymer electrolyte system may use a simple polymer or a polymer-salt complex produced from a coordinate bond of the polymer and a salt.

Hereinafter, the formation of the multi-component composite film will be described.

The support layer film is preferably prepared by blending or laminating at least one polymer selected from the group consisting of high-density polyethylene, low-density polyethylene, linear low-density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyamide, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and a copolymer thereof, or a derivative thereof.

The high crystalline polypropylene preferably has at least one characteristic selected from the group consisting of a density equal to or greater than 0.905 g/cc, a melting point equal to or higher than 125° C., crystallinity equal to or greater than 50%, isotacticity (or pentad ratio) equal to or greater than 96%, and an atactic ratio of less than 5%.

The material of the gellable polymer layer may be selected according to use of the multi-component composite film, and the gellable polymer is generally at least one selected from the group consisting of polyvinylidene fluoride, polyvinylidene fluoride-chlorotrifluoroethylene copolymer, polyvinylidene fluoride-hexafluoropropylene copolymer, polyethylene oxide, polybutylene oxide, polyurethane, polyacrylonitrile, polyacrylate, polymethyl methacrylate, polyacrylic acid, polyamide, polyacrylamide, polyvinyl acetate, polyvinylpyrrolidone, polytetraethylene glycol diacrylate, polysulfone, polyphenylene oxide, polycarbonate chloride, polysiloxane, polyolefin ionomer, and a copolymer thereof, or a derivative thereof.

The gellable polymer layer preferably comprises a polymer-lithium salt complex so that an ion transference number of the gellable polymer layer increases by anion fixation. The gellable polymer layer may further comprise at least one selected from the group consisting of LiSCN, LiClO$_4$, LiCF$_3$SO$_3$, LiAsF$_6$, LiN(CF$_3$SO$_2$)$_2$, and LiBF$_4$, each having a lithium lattice energy greater than their dissolution energy, which is in accordance with the coordinate bond of an electron-donating element and a lithium ion.

In addition, the gellable polymer layer may further include at least one porous inorganic compound selected from the group consisting of SiO$_2$, TiO$_2$, Al$_2$O$_3$, MgO, and B$_2$O$_3$.

Hereinafter, the preparation method of the multi-component composite film will be described.

The multi-component composite film of the present invention is prepared by coating the support layer film with the aforementioned gellable polymer solution to form a gellable polymer layer on either or both sides of the support layer film, and stretching it to form pores on the support layer film, so that the support layer film and the gellable polymer layer are united together without an interface between them. The stretching process forms pores in the gellable polymer layer as well as the support layer film.

More specifically, the multi-component composite film is prepared according to the method comprising the steps of:
a) providing a polymer support layer film;
b) dissolving a gellable polymer in a solvent to prepare a gellable polymer solution;
c) coating said support layer film of a) step with said gellable polymer solution of b) step to form a gellable polymer layer on either or both sides of the support layer film to provide a multi layer film; and
d) stretching the multi layer film, followed by thermal setting it.

The support layer film is preferably prepared by extruding the aforementioned polymer in an extruder equipped with T-die or a tubular die, and annealing it in a dry oven between room temperature and the greatest melting point of the aforementioned polymers in order to increase its crystallinity and elastic recovery.

In addition, an ion-beam irradiation step can be added to the preparation steps of the multi-component composite film of the present invention with a reactive gas in order to increase the interfacial adhesion strength. The ion beam irradiation modifies the surface of the film, and it can be performed before or after annealing, depending on the properties of the multi-component composite film.

The ion-beam irradiation is performed by placing a support layer film in a high vacuum chamber at $10^{-1}$ to $10^{-6}$ torr, injecting at least one ion source selected from the group consisting of electrons, hydrogen, helium, oxygen, nitrogen, carbon dioxide, air, fluoride, neon, argon, krypton, and N$_2$O into an ion gun, such that it has an energy ranging from 0.01 to $10^6$ keV, and irradiating the ion-beam on either or both sides of the support layer film with variation of an ion-beam current. The irradiation amount of the ion beam preferably ranges from $10^5$ to $10^{20}$ ions/cm$^2$. While the ion-beam is irradiating, at least one reactive gas selected from the group consisting of helium, hydrogen, oxygen, nitrogen, ammonia, carbon monoxide, carbon dioxide, tetrafluoro carbon, methane, and N$_2$O is added to the film at a flow rate of 0.5 to 20 ml/minute in order to modify the surface of the film.

The gellable polymer layer is formed on either or both sides of the support layer film with use of the gellable polymer solution. The gellable polymer solution is prepared by dissolving the aforementioned polymer in a solvent.

The solvent is at least one selected from the group consisting of 1-methyl-2-pyrrolidone (NMP), acetone, ethanol, n-propanol, n-butanol, n-hexane, cyclohexanol, acetic acid, ethyl acetate, diethyl ether, dimethyl formamide (DMF), dimethylacetamide (DMAc), dioxane, tetrahydrofuran (THF), dimethyl sulfoxide (DMSO), cyclohexane, benzene, toluene, xylene, and water, or a mixture thereof. The concentration and coating condition of the gellable polymer solution can be controlled depending on the material used in preparation of the multi-component composite film, and the concentration of the gellable polymer solution preferably ranges from 0.01 to 90 wt %. The gellable polymer solution can be prepared by adding the aforementioned lithium salt, porous inorganic particles, or a mixture thereof to the solvent.

The gellable polymer layer is formed in two ways. First, the support layer film is coated with the gellable polymer solution, and the support layer film is dried under a preferred drying condition to form the gellable polymer layer. Secondly, a release paper or a release film is coated with the gellable polymer solution in order to form the polymer film on the release paper, the coated film is dried under the suitable drying condition, the polymer film is desorbed from the release paper, and the desorbed polymer film is heat-set on the support layer film. The heat-set process is performed at room temperature to a melting point of the support layer or the gellable polymer of the gellable polymer solution.

In the coating process of the gellable polymer solution on the support layer film or the release film, the coating is performed by various techniques such as dip coating, roll coating, spray coating, spin coating, die coating, and roll coating, and the coating technique is not limited in the coating process. The thickness of the coated films can be controlled depending on a final use of the multi-component composite film, and if the thickness of the support layer film ranges from 1 to 50 μm, the thickness of the gellable polymer layer after coating preferably ranges from 0.01 to 25 μm.

The coating step can be performed either before or after, or both before and after the annealing step, and the ion-beam irradiation process can be performed with a reactive gas before the coating process, depending on the properties of the multi-component composite film.

The drying process of the coated gellable polymer solution is preferably performed under a gas atmosphere using at least one selected from the group consisting of nitrogen, oxygen, carbon dioxide, and air, at a relative humidity of 1 to 100%.

Pores are formed on the heat-gellable polymer layer on either or both sides of the support layer film, after the gellable polymer layer is formed on either or both sides of the support layer film.

In general, pores are formed on a polymer film by phase transition or a dry process. For example, pores can be formed through phase transition by preparation of a polymer solution, and phase transition between the polymer and the solvent with a suitable use of temperature or a non-solvent, and the properties of the prepared film are affected by the phase-transition conditions. As another example, pores can be formed through a dry process by orientation of the crystalline region of the polymer in a certain direction, low-temperature-stretching it, and rupturing the amorphous region which is relatively soft compared to its crystalline region, wherein the properties of the prepared film are affected by the orientation in the crystalline region and the degree of the orientation.

In the present invention, the stretching process is performed after forming the gellable polymer layer on either or both sides of the support layer film. There are differences between the pore size and distribution of the support layer film and those of the gellable polymer layer. Pores are formed on the support layer by the dry process, wherein the crystalline structure of a precursor is oriented in a certain direction in preparation of a precursor film, and the oriented precursor film is stretched, thereby forming pores. On the other hand, pores are formed on the gellable polymer layer by both the phase transition and dry processes, wherein micro-pores or micro-cracks of the gellable polymer layer are formed by phase transition between the gellable polymer and the solvent, and the pore size or the micro-crack size increases due to the stretching process. In particular, the phase transition condition causes the gellable polymer layer to have various types of structure such as a dense structure or a structure having micro-pores or micro-cracks before the stretching process.

Therefore, the pore size and its distribution of the support layer film and the gellable polymer layer are affected by the method of formation of the pores.

The stretching process includes low-temperature-stretching and high-temperature-stretching. In the low-temperature-stretching process, the gellable polymer layer is formed on either or both sides of the support layer film in order to prepare a multi-layer, the multi-layer is mono-axially or bi-axially stretched at a temperature ranging from 0 to 50° C. with use of a roll or other stretching machine in order to form micro-cracks, and the pores that are formed on the gellable polymer increase.

In the high-temperature-stretching process, the micro-cracks that are formed by the low-temperature-stretching are mono-axially or bi-axially stretched with use of a roll or other stretching machine at between 50° C. and a melting point of the gellable polymer in order to form pores having a desired size, so the mechanical properties of the film are brought about by the high-temperature stretching.

The multi-film that is low-temperature-stretched and high-temperature-stretched is heat-set. The heat-set processing is performed at a temperature ranging from 50° C. to a melting point of the support layer or the gellable polymer layer under tension for 10 seconds to an hour, and the multi-component composite film comprising the support layer film and gellable polymer layer is thereby finally prepared.

The multi-component composite film of the present invention has an improved interfacial adhesion strength between the support layer and the gellable polymer layer due to inter-diffusion between the polymer chains of the support layer and the gellable polymer layer after the high-temperature-stretching and the heat-setting, and the interface between the support layer film and the gellable polymer layer is not well-defined because the support layer film and the gellable polymer layer are united together. In particular, when the ion-beam irradiation on the support layer is performed with the reactive gas, the interfacial adhesion strength between them improves further.

The multi-component composite film, after the high-temperature-stretching and heat-setting, comprises a support layer film having a pore size ranging from 0.001 to 10 μm with a thickness ranging from 1 to 50 μm, and a porous gellable polymer layer having a pore size of 10 μm at most with a thickness ranging from 0.01 to 25 μm, and the film of the present invention is preferably applied to a polymer electrolyte system or an electrochemical element.

Some steps of the method according to the present invention may be skipped and steps may also be added depending upon the final use of the multi-component composite film, and the sequence of each of the steps may be changed.

Figure 8:
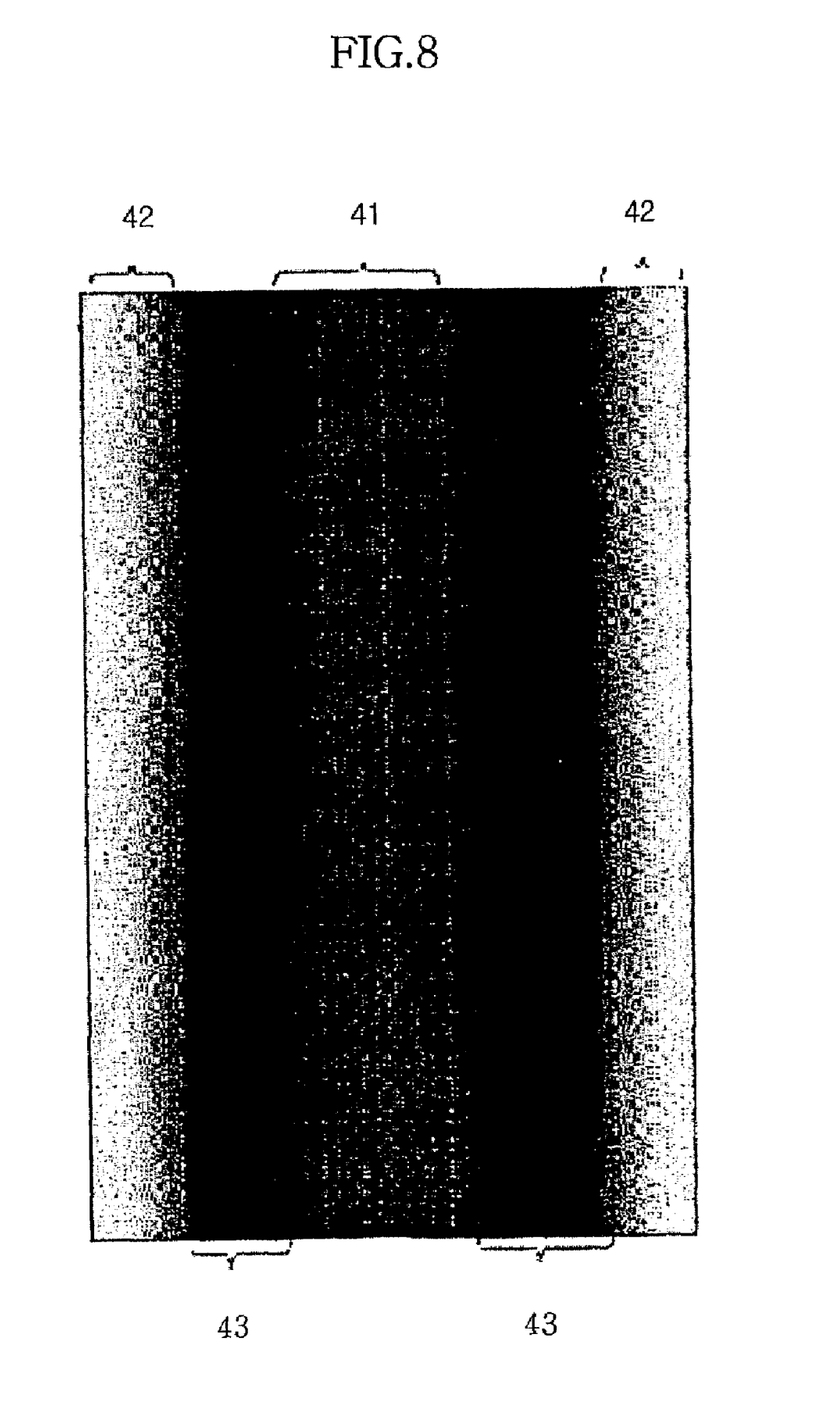
FIG. 8 shows a multi-component composite film structure, wherein gellable polymer layers (42) are located on both sides of a support layer film (41), and the interface (43) between the layers does not appear clearly, after stretching and heat-setting the support layer film (41) coated with a gellable polymer (42)

FIG. 8 shows a cross-sectional view of an exemplary multi-component composite film of the present invention wherein gellable polymer layers 42 are located on the both side of a support layer film 41. It is also shown that the interface 43 between the support layer film 41 and the gellable polymer layer 42 is not well-defined after stretching and heat-setting. The multi-component composite film comprising a united support layer film and a gellable polymer layer without an interface between them has good ionic conductivity and electrochemical stability.

Accordingly, it is preferable to use the multi-component complex film for one or more of the separator layers of a fuel cell or a bicell, or for the separator film interposed between each stacked cell.

According to the present invention, since the electrochemical element comprising stacked cells uses the multi-component complex film as. the separator layer or the separator film, the resultant polymer electrolyte system comprises:

a) i) a porous support layer film; and
ii) a multi-component composite film comprising a porous gellable polymer layer which is formed on either or both sides of the porous support layer film of a) i),
wherein the support layer film of a) i) and the gellable polymer layer of a) ii) are united together without an interface between them; and b) a liquid electrolyte comprising i) a salt represented by Formula 1; and ii) an organic solvent:

$$A^+B^-  \quad \text{Formula 1}$$

wherein $A^+$ is at least one selected from the group consisting of an alkali metallic cation and a derivative thereof, and $B^-$ is at least one selected from the group consisting of $PF_6^-$, $BF_4^-$, $Cl^-$, $Br^-$, $I^-$, $AsF_6^-$, $CH_3CO_2^-$, $CF_3SO_3^-$, $N(CH_3SO_2)_2^-$, and $C(CH_3SO_2)_3^-$.

The multi-component composite film of a) is a polymer, it can be used for a separator and a solid electrolyte, and its air permeability ranges from 100 to 20,000 sec/100 cc.

The liquid electrolyte of b) fills up the pores of the support layer film, and the gellable polymer layer is swelled and gellated when the liquid electrolyte of b) meets the multi-component composite film of a). In order to increase the ionic conductivity of the liquid electrolyte, it is preferable that the thickness of the gellable polymer layer is thinner than that of the support film. The thin thickness of the gellable polymer brings low impedance that is influenced by the thickness of the polymer electrolyte.

The liquid electrolyte of b) comprises a salt represented by Formula 1 that is dissolved and dissociated in an organic solvent of b) ii).

It is preferable that the organic solvent of b) ii) is at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxy ethane, tetrahydrofuran, N-methyl-2-pyrrolidone (NMP), and ethyl methyl carbonate (EMC).

The battery structure provided in the present invention is very effective for a prismatic battery. Generally, liquid electrolyte is injected during packaging For such a purpose, an aluminum prismatic can or an aluminum-laminated film can be used as a container. Unlike a jellyroll of a lithium ion battery, the constituents of the battery according to the present invention have a form coinciding with the form of the quadrilateral container so that there will be no unused space within the container. Therefore, the energy density of the battery can be greatly increased to implement a highly integrated battery having maximized space efficiency of active materials.

The electrochemical element of the present invention can be applied to various fields such as supercapacitors, ultra-capacitors, primary batteries, secondary batteries, fuel cells, sensors, electrolysis devices, electrochemical reactors, etc, in addition to lithium secondary batteries.

The present invention will be explained in detail with reference to the examples. These examples, however, should not in any sense be interpreted as limiting the scope of the present invention.

EXAMPLES

Example 1

Preparing a Stacked Cell where a Fuel Cell is a Basic Unit (Preparing Positive Electrodes)

$LiCoO_2$, carbon black, and PVDF, of which the weight ratio was 95:2.5:2.5, were dispersed in 1-methyl-2-pyrrolidone (NMP) in order to prepare a slurry. The slurry was then coated on aluminum foil on both sides of the aluminum foil. After sufficiently drying at 130° C.; the positive electrodes were prepared by pressing. The thickness of the positive electrode was 115 μm.

(Preparing an Negative Electrode)

Graphite: acetylene black: PVDF, of which the weight ratio was 93:1:6, were dispersed in NMP in order to prepare a slurry The slurry was then coated on a copper foil on both sides of the copper. After sufficiently drying at 130° C., the negative electrodes were prepared by pressing. The thickness of the negative electrode was 120 μm.

(Preparing a Multi-Component Composite Film)

A high crystalline polypropylene was used for a material of a precursor film. It had a melt index of 2.0 g/10 minutes, a density of 0.91 g/cc, a melting point of 166.5° C. which was measured with DSC (Differential Scanning Calorimeter), a crystallization temperature of 116.5° C., a crystallinity of 57%, an isotacticity of 98% which was measured with $C^{13}$ nuclear magnetic resonance (NMR), and an atactic fraction of about 2% which was measured after being dissolved in xylene. The precursor film was prepared from the high crystalline polypropylene with use of a single screw extruder equipped with a T-die and a take-up device. The extrusion temperature and cooling-roll temperature were respectively 220° C. and 80° C. The take-up speed was 20 m/min., and the draw down rate (DDR) was 60.

The precursor film was annealed in a dry oven at 150° C. for an hour.

After annealing, the solution that was dissolved in acetone was dip-coated on both sides of the prepared precursor film. The coating was performed under air while maintaining 60% relative humidity, and the acetone was vaporized at the same condition of 60% relative humidity.

The coated precursor film was mono-axially low-temperature-stretched to 50% of the stretching ratio based on the initial length of the film at room temperature, and it was further mono-axially low-temperature-stretched to 100% of the stretching ratio based on the initial length of the film at 140° C.

After high-temperature-stretching, the high-temperature-stretched precursor film was heat-set at 140° C. under tension for 10 minutes, and it was cooled in order to prepare a multi-component composite film. The properties of the multi-component composite film were measured, and the properties are shown in Table 1.

The air permeability and interfacial adhesion strength of the multi-component composite film were respectively measured by JIS P8117 and JIS Z 0237, its pore size was measured with a scanning electron microscope, and wet-out rate of an electrolyte was measured by measuring a time for wet-out of 2 cm² of the multi-component composite film in an electrolyte wherein ethylene carbonate and dimethyl carbonate were mixed together in a volume ratio of 4:6.

TABLE 1

|  | Multi-Component Composite Film |
|---|---|
| Thickness (μm) | |
| Support layer | 17 |
| Gellable polymer layer | 1 |
| Pore size (μm × μm) | |
| Support layer | 0.3 × 0.1 |
| Gellable polymer layer | 0.8 × 0.3 |
| Air permeability (sec/100 cc) | 520 |
| Interfacial adhesion strength ($g_f$) | 160 |
| Wet-out rate of an electrolyte (sec) | 9 |

(Preparing a Fuel Cell)

The positive electrodes prepared in a manner mentioned above were cut to the rectangular size of 2.9 cm×4.3 cm, except for an area where a tab was to be formed, and the negative electrodes prepared in a manner mentioned above were cut to the rectangular size of 3.0 cm×4.4 cm, except for an area where a tab was to be formed.

The multi-component composite film prepared in a manner mentioned above was cut to the size of 3.1 cm×4.5 cm and interposed between the negative electrodes and the positive electrodes, and by passing them through a roll laminator of 100° C. to laminate each electrode and the separator layer, the fuel cells were obtained.

(Stacking Fuel Cells)

The fuel cells 17', 17, and 17" were placed as in structure 20 of FIG. 3 in the sequence of 17', 17, and 17" with the single-side coated electrodes at the electrode current collector of the outermost side. The multi-component composite films were cut to the size of 3.1 cm×4.5 cm and inserted between the adjoining portions of the fuel cells. Next, they were passed through a roll laminator of 100° C. to laminate the fuel cells and the polymer films.

(Preparing a Battery)

The prepared fuel cell stacked battery was placed within the aluminum laminate package. Then the liquid electrolyte comprising a 1:2 weight ratio of EC/EMC of 1 M $LiPF_6$ was injected therein and it was packaged.

(Evaluating the Performance of the Battery)

Figure 9:
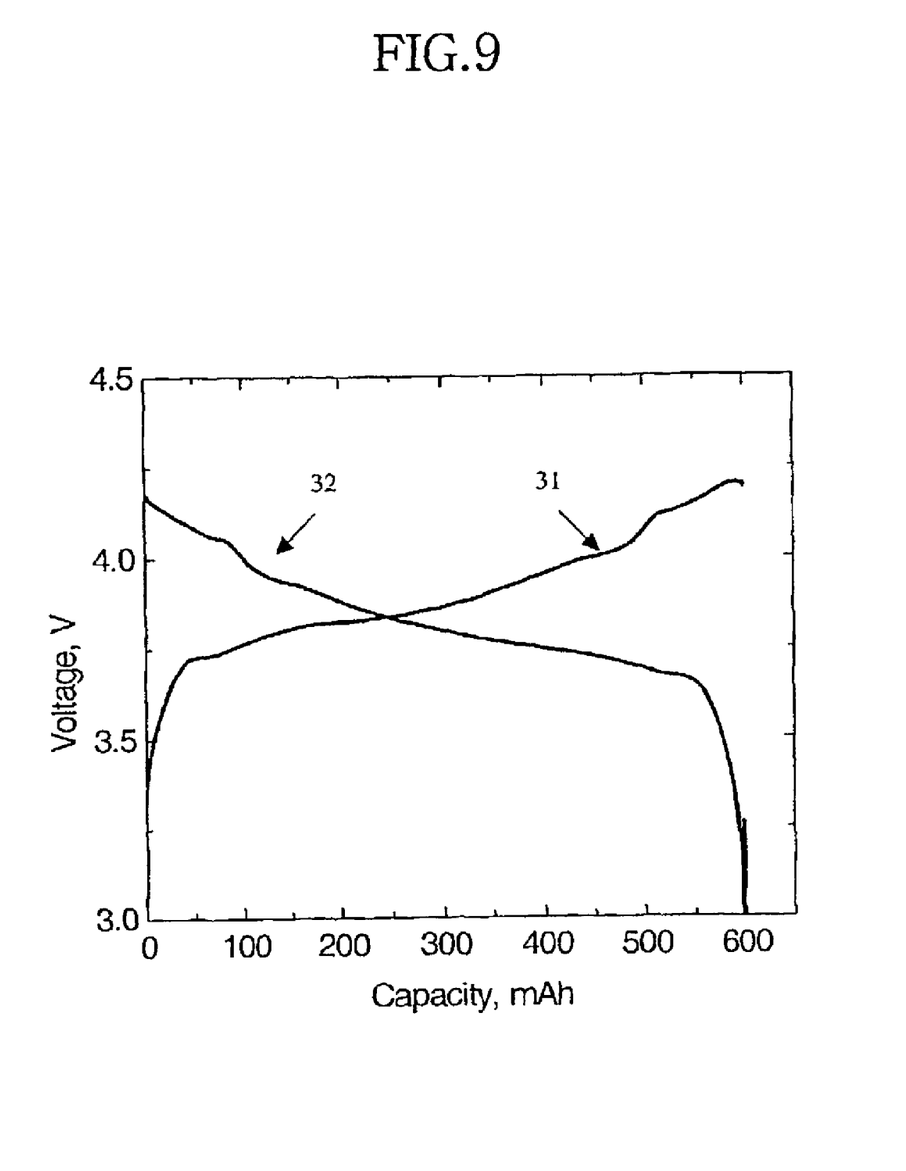
FIG. 9 shows charge and discharge characteristics of the electrochemical element according to Example 1.

Tests were carried out to evaluate the performance of the battery, Firstly, the battery was charged and discharged under the condition of 0.2 C. The battery was charged with the constant current until reaching 4.2V and then charged to maintain the constant voltage of 4.2 V. The charge profile is shown as 31 of FIG. 9. The discharge was performed with the constant current to 3 V and the profile thereof is shown as 32 of FIG. 9.

Figure 10:
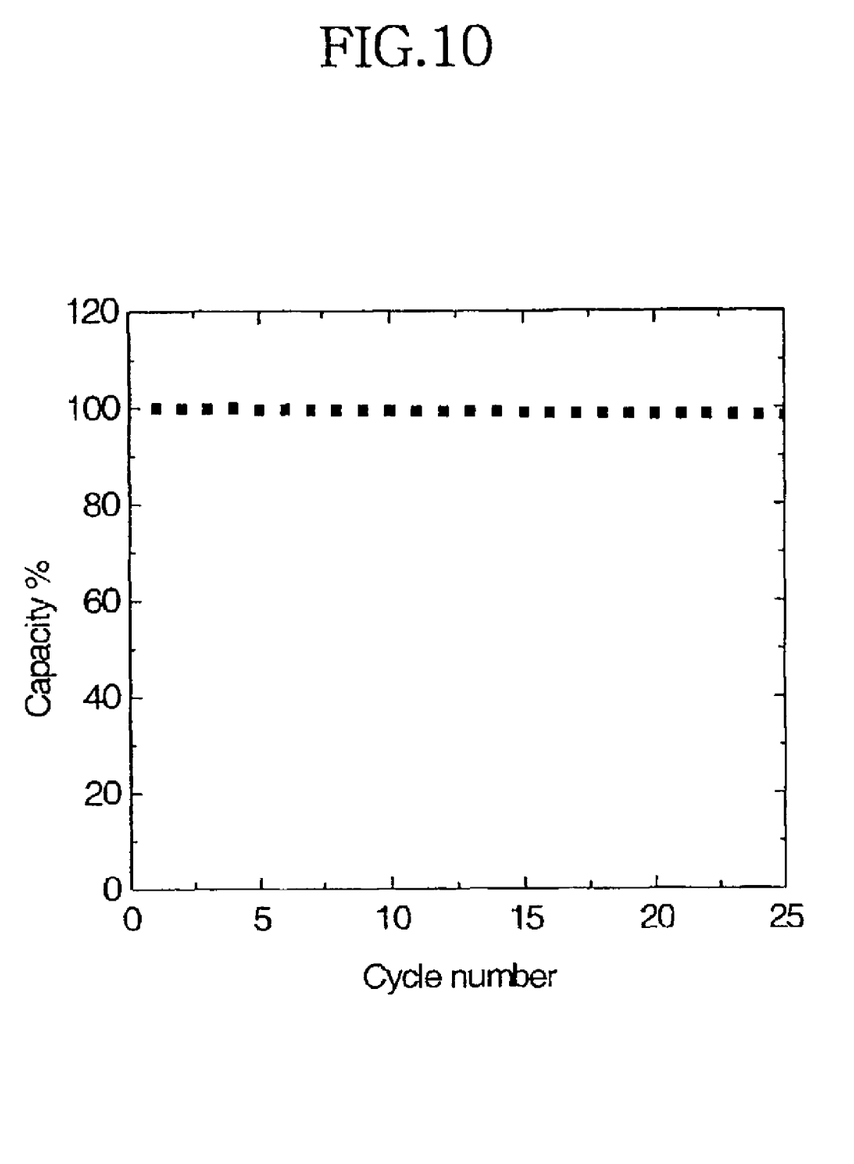
FIG. 10 shows charge and discharge cycle characteristics of the electrochemical element according to Example 1.

The other test for evaluating the performance of the battery is to measure the change of capacity according to charge and discharge cycles under the condition of 1C. FIG. 10 shows the small change in capacity from the initial capacity. It is therefore understood that the battery can be provided with good cycle characteristics by improving the adhesion of the interface of the polymer electrolyte.

Example 2

Preparing a Stacked Cell where a Bicell is a Basic Unit (Preparing a Positive Electrode)

Each positive electrode was prepared according to the same method as in the above Example 1.

A positive electrode of the bicell that was to be placed in the inner side was prepared by coating the slurry on both sides of aluminum foil. That is, the positive electrode has a positive active material coated on both sides of the aluminum positive current collector. The thickness of the positive electrodes was 140 μm.

(Preparing an Negative Electrode)

Each negative electrode was prepared was prepared according to the same method as in the above Example 1.

Negative electrodes that were to be placed in the outermost sides of the outermost fuel cells were prepared by coating the slurry and on both sides of copper negative current collectors, and negative electrodes that were to be placed in the inner side were prepared by coating the slurry on both sides of copper negative current collectors. In this case, the negative electrode has an negative active material coated on both sides of the copper negative current collector. The thickness of the negative electrodes was 135 μm.

(Preparing a Multi-Component Film for a Separator Film and a Separator Layer)

The separator layers, separator films, and polymer film for polymer electrolyte were prepared in a manner identical to Example 1.

(Preparing Bicells to be Placed in the Inner Side)

Positive electrodes having the aforesaid positive active material coated on both sides of a positive current collector were cut to the rectangular size of 2.9 cm×4.3 cm, except for an area where a tab was to be formed. An negative electrode having an negative active material coated on both sides of an negative current collector was cut to the rectangular size of 3.0 cm×4.4 cm, except for an area where a tab was to be formed.

The bicell 23 of FIG. 5a was prepared by placing a both-side coated negative electrode in the middle and the both-side coated positive electrodes at the outer sides, cutting multi-component composite films prepared in a manner mentioned above to the size of 3.1 cm×4.5 cm, interposing the above films between the negative electrode and the positive electrodes, and passing it through a roll laminator of 100° C. to laminate the electrodes and the separator layers.

Another bicell, that is, the bicell 24 of FIG. 5b was prepared by placing a both-side coated positive electrode in the middle and both-side coated negative electrodes at the outer sides, cutting multi-component composite films prepared in a manner mentioned above to the size of 3.1 cm×4.5 cm, interposing the above films between the negative electrodes and the positive electrode, and passing it through a roll laminator of 100° C. to laminate the electrodes and the separator layers.

(Preparing Bicells to be Placed in the Outermost Side)

The fuel cells 24' of FIG. 7 were each prepared by cutting negative electrodes having negative active material coated on a single side of the current collectors and an negative electrode having negative active material coated on both sides of the current collector to the rectangular size of 2.9 cm×4.3 cm, except for an area where a tab was to be formed; cutting a positive electrode having positive active material coated on both sides of the positive current collector to the rectangular size of 3.0 cm×4.4 cm, except for an area where a tab was to be formed; placing a single-side coated negative electrode, a both-side coated positive electrode, and a both-side coated negative electrode together in that order; cutting multi-component composite films prepared in a manner mentioned above to the size of 3.1 cm×4.5 cm; interposing the above films between the negative electrodes and the positive electrode; and passing it through a roll laminator of 100° C. to laminate the electrodes and the separator layers.

(Stacking Bicells)

The bicells 23 and 24' were placed as in structure 26 of FIG. 7 in the sequence of 24', 23, and 24' with the single-side coated negative electrode electrodes at the outermost sides. The multi-component composite films were cut to the size of 3.1 cm×4.5 cm and inserted between the adjoining portions of the bicells. Next, they were passed through a roll laminator of 100° C. to laminate the bicells and the polymer films.

(Preparing a Battery)

The prepared stacked bicell battery was placed within an aluminum laminate package. Then a liquid electrolyte comprising a 1:2 weight ratio of EC/EMC of 1 M $LiPF_6$ was injected therein and it was packaged.

The electrochemical element according to the present invention multiply-stacked with fuel cells or bicells as a unit cell is easy to manufacture, has a structure which uses the space available efficiently, and particularly it can maximize the content of the active electrode material so that a highly integrated battery can be implemented. The multi-component composite film interposed between each stacked cell and used to separate layers of the present invention has good electrochemical stability, adhesion to an electrode, wet-out rate of an electrolyte, and stability, and even though extraction or removal processes of a plasticizer are not performed, it has both good ionic conductivity and mechanical properties, such that the film of the present invention can be used in a polymer electrolyte system with electrochemical elements, and as a separator.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrochemical element comprising electrochemical cells which are multiply-stacked with a separator layer interposed between each stacked cell, wherein said separator layer is a multi-component composite membrane comprising:
   a) a porous polymeric support layer; and
   b) a porous gellable polymer layer which is formed on one side or both sides of the porous polymeric support layer,
   wherein the porous polymeric support layer and the porous gellable polymer layer have the same or different pore size and are united with each other.

2. An electrochemical element comprising electrochemical cells which are multiply-stacked, wherein
   a) said electrochemical cells are formed by stacking:
      i) fuel cells having a positive electrode, a separator layer, and an negative electrode sequentially as a basic unit; or
      ii) ① bicells having a positive electrode, a separator layer, a negative electrode, another separator layer, and another positive electrode sequentially as a basic unit or
      ② bicells having a negative electrode, a separator layer, a positive electrode, another separator layer, and another negative electrode sequentially as a basic unit; and
      iii) a separator layer interposed between each stacked cell;
   b) each of said separator layers comprise a multi-component composite membrane comprising:
      i) a porous polymeric support layer and
      ii) a porous gellable polymer layer which is formed on one side or both sides of the porous polymeric support layer,
      wherein said porous polymeric support layer and the porous gellable polymer layer have the same or different pore size and are united with each other.

3. The electrochemical element according to claim 2, wherein a material of the porous polymeric support layer of b) i) is at least one selected from the group consisting of high-density polyethylene, low-density polyethylene, linear low-density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and a copolymer thereof or a derivative thereof.

4. The electrochemical element according to claim 2, wherein a material of the porous gellable polymer layer of b) i) is at least one selected from the group consisting of polyvinylidene fluoride, polyvinylidene fluoride-chlorotrifluoroethylene copolymer, polyvinylidene fluoride-hexafluoropropylene copolymer, polyethylene oxide, polypropylene oxide, polybutylene oxide, polyurethane, polyacrylonitrile, polyacrylate, polymethyl methacrylate, polyacrylic acid, polyamide, polyacrylamide, polyvinyl acetate, polyvinylpyrrolidone, polytetraethylene glycol diacrylate, polysulfone, polyphenylene oxide, polycarbonate, polyester, polyvinylidene chloride polysiloxane, polyolefin ionomer, and a copolymer thereof or a derivative thereof.

5. The electrochemical element according to claim 2, wherein the porous gellable polymer layer comprises at least one lithium salt selected from the group consisting of LiSCN, $LiClO_4$, $LiCF_3SO_3$, $LiAsF_6$, $LiN(CF_3SO_2)_2$, and $LiBF_4$.

6. The electrochemical element according to claim 2, wherein the porous gellable polymer layer comprises at least one porous inorganic particle selected from the group consisting of $SiO_2$, $TiO_2$, $Al_2O_3$, $MgO$, and $B_2O_3$.

7. The electrochemical element according to claim 2, wherein a pore size of the porous polymeric support layer of b) i) ranges from 0.001 to 10 $\mu$m, and its thickness ranges from 1 to 50 $\mu$m; and a pore size of the porous gellable polymer layer of b) ii) is at most 10 $\mu$m, and its thickness ranges from 0.01 to 25 $\mu$m.

8. The electrochemical element according to claim 2, wherein the multi-component composite membrane of b) is prepared by the steps of:
   i) providing a porous polymeric support;
   ii) dissolving a gellable polymer in a solvent in order to prepare a gellable polymer solution;
   iii) forming a gellable polymer layer on one side or both sides of the support layer film of i) by coating the support layer film with the gellable polymer solution of ii) in order to prepare a multiple layer; and
   iv) stretching and heat-setting the multiple layer of iii).

9. The electrochemical element according to claim 8, wherein the high-temperature-stretching is performed after low-temperature-stretching of the multiple layer in the stretching process of iv).

10. The electrochemical element according to claim 8, wherein the heat-setting of iv) is performed under the condition of tension at 50° C. or at most a temperature of the polymer melting point of the gellable polymer layer, for 10 seconds to an hour.

11. The electrochemical element according to claim 8, wherein the porous polymeric support layer of i) is prepared by injecting the polymer into an extruder equipped with a T-die or a tubular die in order to extrude the polymer, and annealing it in a dry oven at from room temperature to a polymer melting point of the support layer at most.

12. The electrochemical element according to claim 8, wherein the solvent of ii) is at least one selected from the group consisting of 1-methyl-2-pyrrolidone (NMP), acetone, ethanol, n-propanol, n-butanol, n-hexane, cyclohexanol, acetic acid, ethyl acetate, diethyl ether, dimethyl formamide (DMF), dimethylacetamide (DMAc), dioxane, tetrahydrofuran (THF), dimethyl sulfoxide (DMSO), cyclohexane, benzene, toluene, xylene, water, and a derivative thereof.

* * * * *